United States Patent [19]

Hund et al.

[11] 4,153,465
[45] May 8, 1979

[54] CAZN$_2$(PO$_4$)$_2$ .2H$_2$O ANTICORROSION PIGMENT

[75] Inventors: Franz Hund; Peter Kresse, both of Krefeld, Fed. Rep. of Germany

[73] Assignee: Bayer Aktiengesellschaft, Leverkusen, Fed. Rep. of Germany

[21] Appl. No.: 855,482

[22] Filed: Nov. 28, 1977

[30] Foreign Application Priority Data

Dec. 15, 1976 [DE] Fed. Rep. of Germany ....... 2656779

[51] Int. Cl.$^2$ ............................................... C09D 5/08
[52] U.S. Cl. ............................ 106/14.25; 106/14.39; 106/254; 106/260; 106/292; 106/306; 106/308 F; 106/308 M; 260/40 R; 423/305; 423/306
[58] Field of Search .................... 106/14.12, 292, 306, 106/14.25, 14.29, 254, 260, 308 F, 308 M; 423/305, 306; 260/40 R

[56] References Cited

U.S. PATENT DOCUMENTS 3,967,974    7/1976    Ohnemuller et al. ................. 106/306

OTHER PUBLICATIONS

Strunz, Mineralogische Tabellen, 3rd Ed., 1957, p. 237.
Jacobson, Encyclopedia of Chem. Reactions, 1948, vol. II, p. 176.

*Primary Examiner*—Lorenzo B. Hayes

*Attorney, Agent, or Firm*—Sprung, Felfe, Horn, Lynch & Kramer

[57] ABSTRACT

An anticorrosion pigment suited for paints and lacquers and consisting of CaZn$_2$(PO$_4$)$_2$ . 2H$_2$O crystallizing in the Scholzite lattice and having a specific surface according to BET of from 0.1 to 50 m$^2$/g is produced by a process wherein (a) (i) a salt solution containing calcium and zinc cations in a ratio of about 1:2 is normally, inversely or simultaneously precipitated in air at temperatures of up to about 100° C. with an equivalent or substantially equivalent quantity of a solution containing an alkali metal or ammonium phosphate ion; or (ii) compounds of calcium and zinc, which can be decomposed with relatively strong acids or neutralized with acids, in a ratio of about 1:2, have phosphoric acid or ammonium phosphate added to them in approximately the quantity which is required for decomposition or neutralization, or in a slight excess of that quantity, at temperatures of up to about 100° C.; and (b) the suspension obtained in accordance with (a) (i) or (ii) is heated in air to a temperature of up to about 100° C. or in an autoclave to a temperature of up to about 175° C. over a period of up to about 10 hours, e.g. about 1 to 8 hours, the pigment suspension obtained is washed, filtered off and dried.

12 Claims, No Drawings

CAZN$_2$(PO$_4$)$_2$·2H$_2$O ANTICORROSION PIGMENT

Active anti-corrosion pigments, to which considerable practical importance is attached, are red lead, zinc potassium chromate, zinc dust and zinc phosphate. In view of their lead and chromate(VI)contents, red lead and zinc potassium chromate can only be produced and processed under strict safety measures in the interests of industrial hygiene. Zinc dust paints present considerable processing problems on account of the high zinc metal contents which they require (up to 98% by weight). The zinc phosphate pigments previously recommended as anti-corrosion pigments have anti-corrosion values which are considerably below the values of zinc potassium chromate pigments hitherto used. Accordingly, there is a considerable interest in zinc phosphate pigments with an increased anti-corrosion effect.

Accordingly, the present invention provides anti-corrosion pigments consisting of CaZn$_2$(PO$_4$)$_2$·2H$_2$O crystallizing in the Scholzite lattice and having a specific surface according to BET of from about 0.1 to 50 m$^2$/g and preferably from about 0.5 to 20 m$^2$/g.

The present invention also provides a process for producing CaZn$_2$(PO$_4$)$_2$·2H$_2$O crystallizing in the Scholzite lattice, wherein (a)(i) a salt solution containing calcium and zinc cations in a ratio of about 1:2 is normally, inversely or simultaneously precipitated in air at temperatures of up to about 100° C. with an equivalent or substantially equivalent quantity of a solution containing an alkali metal or ammonium phosphate ion; or (b)(ii) compounds of calcium and zinc which can be decomposed with relatively strong acids or neutralized with acids, in a ratio of about 1:2, have phosphoric acid or ammonium phosphate added to them in approximately the quantity which is required for decomposition or neutralization, or in a slight excess of that quantity, at temperatures of up to about 100° C.; and (b) the suspension obtained in accordance with (a) (i) or (ii) is heated in air to a temperature of up to about 100° C. or in an autoclave to a temperature of up to about 175° C. over a period of up to about 10 hours, e.g. about 1 to 8 hours, the pigment suspension obtained is washed, filtered off and dried.

The present invention also relates to the use of anti-corrosion pigments based on CaZn$_2$(PO$_4$)$_2$·2H$_2$O for the production of anti-corrosion paints or anti-corrosion lacquers.

Finally, the invention also relates to anti-corrosion lacquers containing conventional binders and additives and anti-corrosion pigments based on CaZn$_2$(PO$_4$)$_2$·2H$_2$O with specific surfaces according to BET of from about 0.1 to 50 m$^2$/g in quantities of about 0.1 to 99.0% by weight, based on the total weight.

Hitherto, the compound CaZn$_2$(PO$_4$)$_2$·2H$_2$O has only been known as a naturally occurring mineral with the name of Scholzite (H. Strunz, Mineralogische Tabellen, Akad. Verlagsges. Leipzig, 3rd Edition, 1957, page 237). It crystallizes rhombically with the lattice constants $a = 17.149 \pm 0.003$; $b = 22.236 \pm 0.002$; $c = 6.667 \pm 0.001°$ A 12 molecules/elementary cell and an X-ray density of 3.14 g/cm$^3$(K. J. Taxer, Naturwissenschaften 1970, 57 (4), 192 and H. Strunz and Ch. Tennyson, Z. Kristallogr. 107, 318–324 (1956). Hitherto, there have been no reports of any scientific and industrial processes for producing the compound CaZn$_2$(PO$_4$)$_2$·2H$_2$O.

The hitherto unknown production of the compounds CaZn$_2$(PO$_4$)$_2$·2H$_2$O crystallizing in the Scholzite lattice is carried out, for example, by precipitating an aqueous solution containing Ca$^{2+}$ and Zn$^{2+}$ cations in a ratio of about 1:2 normally, inversely or simultaneously in air at temperatures of up to about 100° C. with an equivalent slightly less than equivalent or slightly more than equivalent quantity of an alkali metal or ammonium phosphate solution, optionally with stirring, keeping the resulting suspension at a temperature of up to about 100° C. in air or at a temperature of up to about 175° C. in an autoclave for a period of up to about 10 hours, optionally with stirring, and washing, filtering off and drying the pigment suspension.

The soluble calcium and zinc salts used are preferably the halides, halogenates, nitrites, nitrates, formates, acetates and other carboxylates. Sulphates are less suitable on account of the simultaneous formation of substantially insoluble calcium sulphate.

In another hitherto unknown method for producing the compound CaZn$_2$(PO$_4$)$_2$·2H$_2$O crystallizing in the Scholzite lattice, compounds of calcium and zinc which can be decomposed with relatively strong acids or neutralized with acids, in a ratio of about 1:2 have phosphoric acid or ammonium phosphate added to them in the quantity which is required for decomposition or neutralization or in a slight excess of that quantity at temperatures of up to about 100° C., optionally with stirring, the suspension obtained is heated to a temperature of up to about 100° C. in air or to a temperature of up to about 175° C. in an autoclave over a period of up to about 10 hours, optionally with stirring, and the resulting pigment suspension is optionally washed, filtered off and dried. Suitable compounds of calcium and zinc which can be decomposed or neutralized with acids are oxides, hydroxides, sulphides, carbonates, basic carbonates, formates, acetates, carboxylates, and the like. Particularly suitable compounds of this type are the inexpensive commercially obtained oxides, hydroxides, carbonates, basic carbonates, formates and acetates, even when they contain relatively small quantities of impurities, for example up to about 5% of corresponding compounds of magnesium.

In both the new processes described hereinbefore for producing the compound CaZn$_2$(PO$_4$)$_2$·2H$_2$O crystallizing in the Scholzite lattice, the specific surface of the pigments, as measured by the BET method, can be adjusted to values of about 0.1 to 50 m$^2$/g by suitably selecting the salts, the concentration, the method of precipitation (normal, inverse or simultaneous), the precipitation rate, the stirring intensity, the precipitation temperature and the temperature and duration of the after-heating step at temperatures of up to about 100° C. in air or in the range from 100° to 175° C. in a autoclave. If the resulting CaZn$_2$(PO$_4$)$_2$·2H$_2$O is proposed to be used as an anti-corrosion pigment, it can be advantageous to adjust the specific surface to certain values within this range.

Suitable binders for the anti-corrosion lacquers according to the invention are the usual binders, for example binders based on alkyd resins, linseed oil and chlorinated rubber. The additives used for the lacquer systems may be the usual lacquer additives, e. g. solvents such as petroleum ether, drying accelerators such as cobalt naphthenates and fillers such as silica.

The analyses carried out on these pigments for determination of CaO, ZnO, P$_2$O$_5$ and H$_2$O in Examples 1 and 2, together with the density as determined by pycnometry with He as displacement gas, the theoretical analytical values and the X-ray density, are compared in Table 1 below. Allowing for the usual analytical errors, the percentage contents show good consistency; the pycnometric and X-ray densities are identical. For further characterization of the compound $CaZn_2(PO_4)_2 \cdot 2H_2O$ produced herein in regard to composition and crystal structure with the mineral Scholzite, the lattice plane intervals and intensities from X-ray diffractometer photographs according to Debye-Scherrer of the analyzed preparations of Examples 1 and 2 are compared in Table 2 with the corresponding values of the mineral Scholzite from the ASTM Card Index (13-445). Allowing for the poor morphology of naturally occurring Scholzite minerals, which has already lead to three different structural determinations, in the first of which the chemical formula was never once correctly reproduced, the consistency of the X-ray data of the instant pure preparations of $CaZn_2(PO_4)_2 \cdot 2H_2O$ preparatively produced for the first time with the mineral Scholzite may be regarded as good.

The following examples all lead to production of the compound $CaZn_2(PO_4) \cdot 2.2H_2O$ with the structure of Scholzite from different starting materials, the proof of formula and structure being given in particular, in Examples 1 and 2. The following examples are intended to illustrate other commercially and economically interesting methods of preparation which, in particular, also include non-polluting processes. In these examples, X-ray analysis is mainly used for detecting the presence of the Scholzite phase. For using the compound $CaZn_2(PO_4)_2 \cdot 2H_2O$ as an anti-corrosion pigment, it is also necessary in many cases to vary the particle size of the pigments. Since the average particle size of the pigment particles is related to the specific BET-surfaces determined on them, this parameter is also quoted on the individual examples (G. Brunnauer, P. H. Emmet and H. Teller, J. Amer. Chem. Soc. 60, 309 (1938).

EXAMPLE 1

600 ml of a 0.5 m $Na_2HPO_4$-solution and 600 ml of a 0.5 m NaOH-solution were introduced into a 4 liter spherical flask equipped with a reflux condenser, and the mixture was heated with stirring to 80° C. After this temperature had been reached, a mixture heated to 80° C. and consisting of 600 ml of a 0.5 m $ZnCl_2$-solution and 300 ml of a 0.5 m $CaCl_2$-solution was added dropwise over a period of 30 minutes with stirring. On completion of the precipitation, the mixture was stirred for another 3 hours at 80° C. After cooling, the product was filtered, washed with 10 liters of water on a filter until free from chlorine and then dried at 105° C. The analysis and pycnometric density of the white pigment are shown in Table 1 and the X-ray data in Table 2. The specific BET-surface amounted to 3.9 m²/g. Tests carried out in the same way at a precipitation temperature of 50° C. produced a specific surface of 8.4 m²/g in the presence of Scholzite lattice. At a precipitation temperature of 20° C., no more Scholzite lattice could be obtained according to X-ray examination. (This is an example of "inverse" precipitation; if zinc and calcium solution were initially introduced and the phosphate and sodium hydroxide solution subsequently added, precipitation would be "normal".)

EXAMPLE 2

1200 ml of water were introduced into a 4 liter spherical flask equipped with a reflux condenser and heated to 100° C. 400 ml solutions, heated to 100° C., of 56.78 g of $Na_2HPO_4$ + 16.0 g of NaOH and of 54.51 g of $ZnCl_2$ + 22.2 g of $CaCl_2$ were added dropwise over a period of 30 minutes with stirring from two heated dropping funnels ("simultaneous" precipitation). On completion of precipitation, the mixture was stirred for 1 hour at 100° C. After cooling, the product was filtered, washed free from chlorine with 10 liters of water and dried at 105° C. The analytical composition and pycnometric density are shown in Table 1 and the evaluation of the X-ray diffracto-gram in Table 2. The specific surface was measured at 1.0 m²/g.

EXAMPLE 3

The procedure of Example 1 was modified to the extent that the precipitation temperature was 90° C. and the precipitation time 20 minutes. According to X-ray examination, Scholzite lattice was present; the specific surface amounted to 16.9 m²/g.

EXAMPLE 4

40.69 g of ZnO + 18.52 g of $Ca(OH)_2$ + 49.0 g of $H_3PO_4$ were dispersed in 50 ml of $H_2O$ in case (a) and in 250 ml of $H_2O$ in case (b). In case (a), the suspension was heated for 3 hours at 100° C. and 150° C. in a steam-saturated autoclave, while in case (b) it was heated at 100° C. in a spherical flask with stirring and reflux cooling. The products obtained were worked up in accordance with Examples 1 and 2. X-ray examination of all the 100° C.-products showed the presence of pure Scholzite structure; a 150° C. autoclave product showed poorer crystallization by comparison with the 100° C.-preparations. In the case of 200° C. and 250° C. autoclave preparations, the Scholzite lattice was barely visible on the X-ray photographs. The 100° C. autoclave product had a specific surface of 1.5 m²/g, while the 100° C. reflux condenser product had a specific surface of 1.2 m²/g.

EXAMPLE 5

62.69 g of $ZnCO_3$ + 25.02 g of $CaCO_3$ and 150 ml of water were mixed with vigorous stirring. 51.45 g of $H_3PO_4$ (5% excess over the theoretical quantity) in the form of an 85.4% solution were then added to the resulting mixture with stirring over a period of 5 minutes at room temperature, followed by dilution with 50 ml of water. The suspension was stirred for 3 hours at 100° C. in a 500 ml spherical flask equipped with a reflux condenser. The product was worked up in accordance with Examples 1 and 2. According to X-ray examination of the product, pure Scholzite lattice was present; the white pigment had a specific surface of 6.3 m²g.

EXAMPLE 6

18.52 g of $Ca(OH)_2$ (commercial-grade milk of lime) and (a) 49.0 g of $H_3PO_4$ (stoichiometric quantity) or (b) 51.45 g of $H_3PO_4$ (5% excess over the stoichiometric quantity) were added with stirring at room temperature to 62.69 g of $ZnCO_3$ (containing approximately 2% of $MgCO_3$) in an approximately 40% suspension of an industrial zinc carbonate sludge from a zinc processing plant. The suspension was heated with stirring to 100° C. in a 500 ml spherical flask equipped with a reflux condenser and kept at that temperature for 3 hours. The white pigment was worked up in the same way as described in Examples 1 and 2. X-ray photographs of both preparations showed pure Scholzite lattice. The pigment containing the stoichiometric quantity of $H_3PO_4$ had a specific surface of 6.5 m$^2$/g against a corresponding value of 4.7 m$^2$/g for the pigment containing the 5% excess of H$_3$PO$_4$.

EXAMPLE 7

62.69 g of ZnCO$_3$ (industrial sludge according to Example 6) in an approximately 40% aqueous suspension, 50 ml of water and 51.45 g of H$_3$PO$_4$ (5% excess over the stoichiometric quantity) were added with stirring over a period of 5 minutes at room temperature to 32.53 g of calcium formate (automatic by-product in organochemical manufacturing processes). The resulting suspension was then heated with stirring to 100° C. in a 500 ml spherical flask equipped with a reflux condenser and kept at that temperature for 3 hours. The product was worked up in the same way as described in Examples 1 and 2. According to Debye-Scherrer X-ray examinations, pure Scholzite lattice was present. The white pigment had a specific surface of 5.3 m$^2$/g.

The new active anti-corrosion pigments based on the compound CaZn$_2$(PO$_4$)$_2$.2H$_2$O of Scholzite structure, produced for the first time, were tested in a long-oil alkyd resin based on tall oil fatty acid of low-resinic acid content in comparison with standard commercial-grade zinc phosphate of hopeite structure, standard commercial-grade, highly disperse red lead and a standard commercial-grade TiO$_2$-pigment of anatase structure (Bayertitan A, a product of Bayer AG). Pigment volume concentrations (PVC) of (a) 32% and (b) 36% were selected for testing.

Basic recipe in parts by weight:
- 167.00 — long-oil alkyd resin, 60% solution in white spirit
- 2.50 — readily volatile oxime as anti-skinning agent (Ascinin ®R 55 (a product of Bayer AG)
- 4.00 — Co-, Pb-, Mn-octoate, 1:2 in xylene
- 1.25 — Ca-octaoate, 4%
- 25.25 — diluent (white spirit/turpentine oil 8:2)

Quantity of pigment according to selected pigment-volume-concentration (PVC).

Grinding is carried out for 5 hours in laboratory vibrating ball mills.

To test the anti-corrosion behavior of the pigments, the primers were sprayed onto bonderized steel plates in such a way that dry layer thicknesses of approximately 45 μ were obtained. After a minimum drying time of 7 days, the anti-corrosion performance was tested by the salt spraying test according to DIN 53 167 and ASTM B 287-61 (long-term spraying with 5% sodium chloride solution at 35±2° C.).

The test plates were evaluated after 3, 8, 11, 18, 24, 31, 38, 45 and 52 days. Assessment was made under a marking system which extended from 0 (=no damage) to 12 (=complete destruction of the paint film). This method of evaluation ws described by P. Kresse in the XIII-Fatipec-Kongreβbuch (Cannes 1976), pages 346–353 in "Der Mechanismus der Einwirkung von Salzlosungen auf anstrichbedecktes Eisen" (The Mechanism of the Action of Salt Solutions on Paint-Coated Iron). The sum of the individual marks awarded on the above-mentioned evaluation days up to 52nd day for the individual pigmenting systems is known as the "degree of corrosion". The larger this sum, i.e. the higher the degree of corrosion in a selected pigment-binder system, the lower is the corrosion-inhibiting effect of the anti-corrosion pigment used.

The degrees of corrosion after 1248 hours (=52 days) are shown in Table 3 for the CaZn$_2$(PO$_4$)$_2$.2H$_2$O-pigment of Scholzite structure according to Example 3, for a commercially available zinc phosphate pigment of hopeite structure, for a commercial-grade pure, highly dispersed red lead pigment and for a commercial-grade TiO$_2$-pigment of anatase structure for the two pigment-volume-concentrations (PVC) quoted of 36% and 32%. By comparison with the commercial zinc phosphate pigment, the degrees of corrosion for the CaZn$_2$(PO$_4$)$_2$.2H$_2$O-pigment according to the present invention are considerably lower both for a PVC of 36% and for a PVC of 32%; in other words the new pigments are better in their corrosion-inhibiting effect than the conventional zinc phosphate pigments.

With the PVC of 32%, the CaZn$_2$(PO$_4$)$_2$.2H$_2$O-pigment of Example 3 is even better than the pure highly dispersed red lead commercial product. A commercial TiO$_2$-product of anatase structure which, for a PVC of 36%, shows the high degree of corrosion of 69 under identical test conditions, is used in Table 3 as an example of a substantially ineffectual anti-corrosion pigment.

Table 1:

| | Analyses and densities of CaZn$_2$(PO$_4$)$_2$ . 2 H$_2$O | | | | | |
|---|---|---|---|---|---|---|
| Example No. | CaO [%] | ZnO [%] | P$_2$O$_5$ [%] | H$_2$O [%] | Analysis sum [%] | Density [g/cc] |
| 1 | 14.2 | 40.5 | 36.4 | 9.0 | 100.1 | 3.11 |
| 2 | 13.7 | 41.3 | 35.8 | 9.2 | 100.0 | 3.14 |
| CaZn$_2$(PO$_4$)$_2$ . 2 H$_2$O | 14.13 | 41.02 | 35.77 | 9.08 | 100.0 | 3.14[*] |

[*] X-ray density according to ASTM-card index 13-445.

Table 2:

| | | | | Lattice plane intervals and X-ray intensities of CaZn$_2$(PO$_4$)$_2$ . 2 H$_2$O | | | |
|---|---|---|---|---|---|---|---|
| Line No. | Lattice plane | | | ASTM 13-445 | | Example 1 | | Example 2 | |
| | h | k | l | d[Å] | I/I$_o$ | d[Å] | I/I$_o$ | d[Å] | I/I$_o$ |
| 1 | — | — | — | — | — | — | — | 9.90 | 2 |
| 2 | 1 | 2 | 0 | 9.43 | 10 | 9.43 | >1 | 9.40 | 2 |
| 3 | 2 | 0 | 0 | 8.50 | 100 | 8.54 | 100 | 8.58 | 100 |
| 4 | — | — | — | — | — | 7.86 | 5 | — | — |
| 5 | — | — | — | — | — | — | — | 7.12 | 3 |
| 6 | — | — | — | — | — | 6.79 | 4 | 6.79 | 4 |
| 7 | 2 | 3 | 0 | 5.58 | 8 | — | — | — | — |
| 8 | — | — | — | — | — | 5.07 | >1 | — | — |
| 9 | — | · | — | — | — | — | · | 4.93 | 1 |
| 10 | 1 | 3 | 1 | 4.73 | 4 | — | — | — | — |
| 11 | 3 | 3 | 0 | 4.51 | 20 | 4.52 | 15 | 4.50 | 15 |
| 12 | — | — | — | — | — | — | — | 4.40 | 3 |
| | 4 | 0 | 0 | | | | | | |
| 13 | | | | 4.27 | 40 | 4.27 | 8 | 4.26 | 25 |
| | 2 | 3 | 1 | | | | | | |
| 14 | 1 | 4 | 1 | 4.15 | 4 | 4.15 | 5 | 4.15 | 14 |
| 15 | — | — | — | — | — | 3.92 | 1 | — | — |
| | 0 | 6 | 0 | | | | | | |
| 16 | | | | 3.72 | 16 | 3.70 | 3 | 3.70 | 3 |
| | 4 | 3 | 0 | | | | | | |
| 17 | 2 | 6 | 0 | 3.39 | 30 | 3.39 | 11 | 3.39 | 10 |
| 18 | 0 | 0 | 2 | 3.33 | 6 | 3.35 | 4 | 3.35 | 10 |
| | 4 | 3 | 1 | | | | | | |
| 19 | | | | 3.24 | 10 | — | — | — | — |
| | 0 | 6 | 1 | | | | | | |
| 20 | 1 | 6 | 1 | 3.19 | 10 | 3.20 | 1 | 3.20 | 3 |
| 21 | — | — | — | — | — | 3.15 | 3 | 3.15 | 5 |
| | 3 | 6 | 0 | | | | | | |
| 22 | | | | 3.09$_6$ | 25 | 3.10 | 6 | 3.10 | 7 |
| | 5 | 3 | 0 | | | | | | |
| 23 | — | — | — | — | — | 3.00 | 1 | 3.00 | 3 |
| | 6 | 0 | 0 | | | | | | |
| 24 | | | | 2.86$_3$ | 16 | 2.84 | 1 | 2.84 | 2 |
| | 3 | 0 | 2 | | | | | | |
| | 0 | 8 | 0 | | | | | | |
| 25 | | | | 2.79$_7$ | 60 | 2.80 | 19 | 2.80 | 20 |
| | 4 | 6 | 0 | | | | | | |

Table 3:

| Type of pigment or formula | Pigment-volume concentration [%] | Degree of corrosion[x] after testing for 1248 hours |
|---|---|---|
| $CaZn_2(PO_4)_2 \cdot 2H_2O$ | 36 | 37.5 |
| (Example 3) | 32 | 18.5 |
| Zinc phosphate | 36 | 57 |
| (Commercial product) | 32 | 65 |
| Red lead, pure, highly dispersed (commercial product) | 36 | 29.5 |
|  | 32 | 32.5 |
| $TiO_2$-anatase | 36 | 69 |
| (Commercial product) |  |  |

[x] Degree of corrosion = sum of evaluations after 1248 hours (= 52 days) - duration of the salt spraying test according to DIN 53 167.

The greater the degree of corrosion, the poorer the corrosion-inhibiting property of the pigments.

It will be appreciated that the instant specification and examples are set forth by way of illustration and not limitation, and that various modifications and changes may be made without departing from the spirit and scope of the present invention.

What is claimed is:

1. A process for the production of $CaZn_2(PO_4)_2 \cdot 2H_2O$ crystallizing in the Scholzite lattice which comprises heating at a temperature up to about 175° C. for up to about 10 hours an aqueous suspension of $CaZn_2(PO_4)_2$, filtering off the $CaZn_2(PO_4)_2 \cdot 2H_2O$ and drying it.

2. A process according to claim 1, wherein heating is effected at a temperature up to about 100° C.

3. A process according to claim 1, wherein heating is effected in an autoclave at a temperature up to about 175° C.

4. A process according to claim 1, wherein the suspension of $CaZn_2(PO_4)_2$ is formed by normal, inverse or simultaneous precipitation by mixing, in water, an alkali metal or ammonium phosphate and salts containing $Ca^{2+}$ and $Zn^{2+}$ ions in a mol ratio of about 1:2.

5. A process according to claim 4, wherein the salts are halides, halogenates, nitrites, nitrates, formates or acetates.

6. A process according to claim 1, wherein the suspension of $CaZn_2(PO_4)_2$ is obtained by mixing, in water, phosphoric acid or ammonium phosphate with compounds of calcium and zinc which can be decomposed or neutralized with relatively strong acids, calcium and zinc being present in a mol ratio of about 1:2.

7. A process according to claim 6, wherein the calcium and zinc compounds are oxides, hydroxides, sulphides, carbonates or basic carbonates.

8. A process according to claim 6, wherein the calcium and zinc compounds are oxides, hydroxides, carbonates, basic carbonates, formates or acetates containing up to about 5% by weight of magnesium compounds.

9. A substantially pure anticorrosion pigment produced by the process of claim 1, consisting of $CaZn_2(PO_4)_2 \cdot 2H_2O$ crystallizing in the Scholzite lattice and having a specific surface according to BET of from about 0.1 to 50 m²/g.

10. A pigment according to claim 9 having a specific surface of from about 0.5 to 20 m²/g.

11. In an anticorrosion paint containing a binder vehicle and a corrosion-inhibiting pigment; the improvement comprising, as said pigment, the pigment according to claim 9.

12. An anticorrosion paint according to claim 11, wherein the binder selected from the group consisting of an alkyd resin, linseed oil and chlorinated rubber.

* * * * *